United States Patent
Wang

(10) Patent No.: US 10,849,341 B2
(45) Date of Patent: Dec. 1, 2020

(54) STEAM PASTEURIZATION METHOD FOR FREEZE-DRIED FOOD

(71) Applicant: Yitian Wang, Beijing (CN)

(72) Inventor: Yuanxi Wang, Shenzhen (CN)

(73) Assignee: Yitian Wang, Beijing (CN)

( * ) Notice: Subject to any disclaimer, the term of this patent is extended or adjusted under 35 U.S.C. 154(b) by 0 days.

(21) Appl. No.: 16/758,355

(22) PCT Filed: Oct. 16, 2018

(86) PCT No.: PCT/CN2018/110353
§ 371 (c)(1),
(2) Date: Apr. 22, 2020

(87) PCT Pub. No.: WO2019/085734
PCT Pub. Date: May 9, 2019

(65) Prior Publication Data
US 2020/0253244 A1    Aug. 13, 2020

(30) Foreign Application Priority Data
Oct. 31, 2017  (CN) .......................... 2017 1 1044523

(51) Int. Cl.
| | | |
|---|---|---|
| *A23L 3/16* | (2006.01) | |
| *A23L 3/015* | (2006.01) | |
| *A23B 4/005* | (2006.01) | |
| *A23L 3/00* | (2006.01) | |
| *A23L 3/36* | (2006.01) | |
| *A23B 4/037* | (2006.01) | |
| *A23B 7/024* | (2006.01) | |
| *A23B 7/005* | (2006.01) | |
| *A23B 9/02* | (2006.01) | |
| *A23L 3/44* | (2006.01) | |

(52) U.S. Cl.
CPC ............ *A23L 3/015* (2013.01); *A23B 4/0053* (2013.01); *A23B 4/037* (2013.01); *A23B 7/0053* (2013.01); *A23B 7/024* (2013.01); *A23B 9/025* (2013.01); *A23L 3/003* (2013.01); *A23L 3/165* (2013.01); *A23L 3/36* (2013.01); *A23L 3/44* (2013.01)

(58) Field of Classification Search
CPC ....... A23B 4/037; A23B 4/005–4/0056; A23B 5/03; A23B 5/005–5/0057; A23B 7/005–7/0056; A23B 7/024; A23B 9/02–9/025; A23B 9/08; A23L 3/02–3/245; A23L 3/44; A23L 3/015; A23L 3/003; A23L 3/36; A23L 5/55
USPC .......................... 426/521, 510–511, 384–385
See application file for complete search history.

(56) References Cited

U.S. PATENT DOCUMENTS

| | | | | |
|---|---|---|---|---|
| 2,128,919 A | * | 9/1938 | Doyle ...................... | A23L 5/55 426/511 |
| 2,278,472 A | * | 4/1942 | Musher ................... | A23B 4/03 426/442 |
| 3,233,333 A | * | 2/1966 | Oppenheimer ........... | F26B 5/06 34/292 |
| 3,304,617 A | * | 2/1967 | Jeppson ................. | A23B 4/037 34/292 |
| 3,721,527 A | * | 3/1973 | Lodige .................... | A23L 3/185 422/36 |
| 5,281,428 A | * | 1/1994 | Morgan ................... | A23B 4/16 426/312 |
| 5,500,238 A | * | 3/1996 | Thienpont ............ | A23B 4/0053 426/511 |
| 5,589,214 A | * | 12/1996 | Palm ....................... | A23B 7/00 426/506 |
| 5,741,536 A | * | 4/1998 | Mauer .................. | A23B 4/0056 426/281 |
| 6,245,294 B1 | * | 6/2001 | Goldberg ................ | A23B 4/16 422/26 |

(Continued)

FOREIGN PATENT DOCUMENTS

| | | |
|---|---|---|
| CN | 101793458 A | 8/2010 |
| CN | 105053164 A | 11/2015 |

(Continued)

OTHER PUBLICATIONS

International Search Report for Application No. PCT/CN2018/110353, dated Jan. 17, 2019.

(Continued)

*Primary Examiner* — Drew E Becker
(74) *Attorney, Agent, or Firm* — Marshall, Gerstein & Borun LLP

(57) ABSTRACT

A method for pasteurizing freeze dried food comprises: 1) Determining the corresponding sterilization temperature according to the food to be sterilized, and determining the target water activity at the sterilization temperature; 2) Cooling the food to a temperature corresponding to the type of the food; 3) Removing the air from the sterilization chamber using a vacuum pump; 4) Introducing water vapor into the sterilization chamber, adjusting the steam flow rate after the food temperature reaches the sterilization temperature, and maintaining the food temperature at the sterilization temperature for a specific duration and ceasing the introduction of water vapor; 5) Capturing steam from the sterilization chamber and reducing the pressure in the chamber; 6) After the pressure in the chamber reaches or approaches the water saturation pressure corresponding to the cooling temperature prior to sterilization, charging clean air into the chamber until the vacuum state is released, and removing the food.

9 Claims, No Drawings

(56) References Cited

U.S. PATENT DOCUMENTS

| | | | |
|---|---|---|---|
| 7,422,726 B2* | 9/2008 | Hammerstedt | A01N 1/02 34/284 |
| 2003/0118471 A1* | 6/2003 | Howe | A23B 9/025 422/26 |
| 2003/0198729 A1* | 10/2003 | Fuhrmann | A23G 1/02 426/631 |
| 2006/0040029 A1* | 2/2006 | Gunawardena | A23B 4/0053 426/521 |
| 2010/0173060 A1* | 7/2010 | Perren | A23L 3/0155 426/521 |
| 2011/0287138 A1* | 11/2011 | Malinsky | A23L 7/10 426/61 |
| 2014/0057029 A1* | 2/2014 | Klerken | B65B 55/06 426/412 |
| 2014/0348987 A1* | 11/2014 | Cheng | A47J 27/08 426/231 |
| 2018/0071415 A1* | 3/2018 | Dern | B01D 46/0027 |
| 2018/0092385 A1* | 4/2018 | Arofikin | A23L 3/24 |
| 2019/0000096 A1* | 1/2019 | Shinohara | A23B 4/0056 |

FOREIGN PATENT DOCUMENTS

| | | |
|---|---|---|
| CN | 106259957 A | 1/2017 |
| CN | 107568558 A | 1/2018 |

OTHER PUBLICATIONS

International Preliminary Report on Patentability for Application No. PCT/CN2018/110353, dated May 5, 2020. (English Translation).

* cited by examiner

STEAM PASTEURIZATION METHOD FOR FREEZE-DRIED FOOD

TECHNICAL FIELD

The invention relates to a method for water vapor pasteurization of food, in particular to a method for water vapor pasteurization of freeze-dried food.

BACKGROUND

Microbiological contamination of low-moisture foods is a rising food safety issue in recent years, and there have been many cases of related food-borne diseases and food recalls. These foods often include dried fruits, spices and pet dry foods. The most common pathogenic bacteria is *Salmonella*, followed by *Listeria monocytogenes* and *E. coli* 0157: H7. All of these pathogenic bacteria have the characteristics of increased heat resistance at low water activity.

Water activity refers to the ratio of the saturated vapor pressure of the food to the saturated vapor pressure of pure water at the same temperature, which reflects the level of free water in food. Foods with low water activity generally refer to foods with a water activity of less than 0.7. Foodborne pathogens such as *Salmonella* cannot grow and reproduce in foods with low water activity, but they can survive for a long time under these conditions. The sterilization of foods with low water activity often requires higher temperature and/or longer heat treatment to achieve sufficient reduction of pathogenic bacterial population. However, high processing temperature or long heating durations will affect the quality and the yield of the product, resulting in loss of nutrients, deformation, discoloration and poor taste. Moreover, increased energy consumption is required yet production efficiency during manufacturing is low.

Steam pasteurization of foods with low water activity resolves the above mentioned problems. First of all, the penetrating ability of hot steam allows it to efficiently enter the pores of foods. The presence of water molecules helps to destroy the hydrogen bonds and other interacting weak bonds which maintain the protein structures, thus easily denaturing the proteins. At the same time, the pasteurization temperature is usually between 60 to 90° C., which can kill pathogenic bacteria but largely maintaining the nutritional components and flavors of the food.

The Log5 system developed by the Dutch company Duyvis Wiener (duyviswiener.com) preheats low-moisture food with warm air, and treats the product in an environment where the water activity, temperature, relative humidity and airflow is controlled. Only the water activity level on the surface of the foods is higher during treatment. Pathogens can be inactivated with a 5-log reduction. During the heating process, the temperature of the food is higher than the dew point, and no moisture absorption occurs.

Napasol North America LLC (www.napasol.com) in the United States preheats nuts, seeds and dried fruits in either a static or a rotary autoclave, then pasteurizes at a relatively low temperature by using saturated steam under vacuum, and finally transfers the product to a cooling chamber.

The steam sterilization unit of Revtech Process Systems (www.revtech-process-systems.com) in France is a vibrating spiral tube with the outer surface electrically heated. The product inside the spiral tube comes in contact with the wall of the tube thus accelerates heating with vibration. The material in the tube is then sterilized by steam and cooled down by circulating cool air into the rear portion of the spiral tube. The entire process runs continuously.

The patent filed in China—"Method for Pasteurizing and Disinfecting the Surface of Food Blocks" (application number of CN200880023032.6) proposes a method for surface pasteurization suitable for oil-containing seed foods. The method comprises: preheating food to a temperature which is close to pasteurization evaporation temperature to minimize the moisture absorption by the food; heat treating the food for 1 to 30 minutes; removing the condensed water on the surface of the food by the subsequent vacuum drying under a further reduced pressure.

Among low-moisture foods, most of the foods processed by vacuum freeze-drying (referred to as lyophilisation) have a porous and loose structure, which allows diffusion of steam into the food. When comparing with foods that are treated by other drying methods, the freeze-dried foods have lower moisture content, generally between 2% and 5%, and it is more difficult to kill pathogenic bacteria under this condition.

The method disclosed in an application for patent invention with the application number CN200880023032.6 was used to sterilize freeze-dried chicken meat. The freeze-dried chicken, which contains a moisture content of 2.8%, was inoculated with *Enterococcus faecalis* (ATCC 8459) and was preheated to 68° C., followed by pasteurization with saturated steam in a vacuum environment. The freeze-dried chicken meat was then heated to 75° C. and held for 60 min as the water vapour pasteurization process. The results show that the number of the *Enterococcus faecalis* was reduced from $2.2 \times 10^8$ CFU/g prior to pasteurization to $1.75 \times 10^7$ CFU/g after the pasteurization, with only 1.1 log units reduction, which is substantially below the target of 5 log units reduction. After the preliminary testing, the water activities of the freeze-dried chicken with a moisture content of 2.8% at 25° C. and 75° C. were 0.06 and 0.39, respectively. Thus, the experimental results show that the method disclosed in the application (CN200880023032.6) is not ideal for sterilizing freeze-dried food with such low water activity.

In addition to pasteurization temperature and saturated steam environment, the water activity of the food itself is also an important factor affecting the sterilization effect. To effectively eliminate pathogenic bacteria such as *Salmonella*, which has improved heat resistance at low water activity in a suitable time period, it is critical to significantly increase the water activity of freeze-dried food. However, the existing steam sterilization method has limitations in the improvement of food water activity. Ultimately, it is impossible to achieve the sterilization effect of 5 log units or more for freeze-dried food with extremely low water activity in a suitable time period while maintaining the product quality.

SUMMARY OF THE INVENTION

With the challenges stated above, the objective of the proposed invention is to provide a water vapor pasteurization method suitable for freeze-dried foods with low water activity. During the pasteurization process, saturated water vapor is used to increase the temperature of food while significantly improving the water activity of food in order to achieve the pasteurization effect of 5 log units or more in a suitable time period.

In order to achieve the above objective, the proposed invention provides a water vapor pasteurization method for freeze-dried food comprising of the following steps:

1) determining the corresponding pasteurization temperature according to the type of freeze-dried food to be pasteurized, and determining the target water activity at the pasteurization temperature;

2) adjusting the food in step 1) to a temperature corresponding to the type of the food;

3) removing air from the pasteurization chamber where the food is sterilized by using a vacuum pump;

4) introducing water vapor into the pasteurization chamber, adjusting the flow rate of the water vapor after the food temperature reaches the pasteurization temperature. The goal is to maintain the food temperature at the pasteurization temperature for a target duration and only then the introduction of the water vapor can be ceased;

5) capturing water vapor from the pasteurization chamber so as to reduce the pressure in the pasteurization chamber;

6) when the pressure in the pasteurization chamber reaches the water saturation pressure corresponding to the cooling temperature prior to pasteurization, charging clean air into the pasteurization chamber until the vacuum state is released, and finally removing the food from the pasteurization chamber.

Preferably, the cooling temperature in step 2) is determined by the following equation:

$$T_1 = T_2 - (x_2 - x_1)*(h_1 - h_2)/c_p$$

Where $c_p$ is the constant pressure specific heat capacity of the food;

$T_1$ is the cooling temperature;

$T_2$ is the pasteurization temperature;

$x_1$ is the initial moisture content of the freeze-dried food;

$x_2$ is the moisture content of the food at the pasteurization temperature and target water activity which is obtained by using an isothermal moisture absorption curve of the food;

$h_1$ is the enthalpy of saturated water vapor at $T_1$ temperature;

$h_2$ is the enthalpy of saturated water vapor at the pasteurization temperature.

Preferably, the pasteurization temperature determined in step 1) is from 60 to 90° C., and the target water activity is from 0.70 to 0.85.

Preferably, in step 3), air is removed from the pasteurization chamber until the absolute pressure in the pasteurization chamber is reduced to between 100 to 3000 Pa.

Preferably, in step 4), the water vapor introduced into the pasteurization chamber should be negative pressure saturated water vapor.

Preferably, in step 4), when the water vapor introduced into the pasteurization chamber is negative pressure saturated water vapor, the pressure of the water vapor source should be equal to or slightly higher than the water saturation pressure corresponding to the pasteurization temperature.

Preferably, in step 4), the saturation temperature corresponding to the negative pressure saturated water vapor should be equal to the pasteurization temperature or be higher than the pasteurization temperature by 10° C. or less.

Preferably, in step 4), the specific pasteurization time should be between 10 min to 90 min.

Preferably, step 5) is specifically carried out by: connecting the pasteurization chamber with a cold trap; condensing or depositing the water vapor on the surface of the cold trap, and then capturing the non-condensable gas by a vacuum pump.

Preferably, the temperature on the surface of the cold trap should be between −40° C. to 10° C.

The benefits achieved by the proposed invention are as follows:

Different from the existing water vapor pasteurization methods, which mainly include a "vacuum-water vapor-vacuum" or "preheat-vacuum-water vapor-cool" processes, the water vapor pasteurization method according to the present invention mainly includes "precool-vacuum-water vapor-capture" four stages and such water vapor pasteurization method is particularly suitable for pasteurization of freeze-dried food.

The freeze-dried foods have a porous and loose structure, which facilitates the diffusion of water vapor into the food, and the pasteurization process is uniform and efficient.

For freeze-dried food with low moisture content, a small adjustment in moisture content will result in tremendous alterations in water activity. Cooling the food before pasteurization can increase the moisture content of the food after coming in contact with the water vapor, so as to immensely increase water activity.

After pasteurization of the food, the water vapor capturing process evaporates the moisture condensed on the surface and in pores of the food, and the food is cooled to ensure quality.

DETAILED EMBODIMENTS

Hereinafter, specific embodiments of the present invention will be described in details.

The pasteurization method in the proposed invention comprises: pre-cooling the freeze-dried food to an appropriate temperature, condensing the low-pressure saturated water vapor on the surface and inside the pores of the food at a lower temperature in the vacuum environment, raising the food temperature such that the moisture content increases and therefore water activity rises rapidly, pasteurizing the food for a period of time at the appropriate pasteurization temperature and elevated water activity. After the pasteurization is complete, evaporating the condensed water by reducing the pressure (capturing water vapor), decreasing the temperature and moisture content of the food such that the food is in a suitable state for storage.

In some embodiments of the invention, the pasteurization method comprises the following steps:

(1) First, selecting a pasteurization temperature suitable for the freeze-dried food and the target water activity at the pasteurization temperature, the temperature ranges from 60° C. to 90° C.; and the target water activity ranges from 0.7 to 0.85.

(2) Cooling the freeze-dried food to be pasteurized. The temperature $T_1$ of the food to be reached before pasteurization can be calculated by the following method: according to the law of energy conservation, the heat required for rising the temperature of the material is equal to the heat released by the water vapor condensation. Without consideration of the heat capacity of the container, the energy balance relationship can be represented as:

$$c_p*(T_2 - T_1) = (x_2 - x_1)*(h_1 - h_2) \qquad (1)$$

Where $c_p$ is the constant pressure specific heat capacity of the food;

$T_1$ is the temperature to be reached before pasteurization of the food;

$T_2$ is the pasteurization temperature;

$x_1$ is the initial moisture content of the freeze-dried food;

$x_2$ is the moisture content of the food at the pasteurization temperature and target water activity which is obtained by using the isothermal moisture absorption curve of the food;

$h_1$ is the enthalpy of saturated water vapor at $T_1$ temperature;

$h_2$ is the enthalpy of saturated water vapor at $T_2$ temperature

The temperature of the food before the pasteurization can be calculated by the following equation:

$$T_1 = T_2 - (x_2 - x_1)^*(h_1 - h_2)/c_p \quad (2)$$

If $T_1$ calculated using the above equation (2) is too low, the proposed method will be difficult to execute. As a consequence, the pasteurization effect can be achieved by appropriately adjusting the target water activity and extending the pasteurization time.

(3) Removing the air from the pasteurization chamber where the food is located. After the absolute pressure in the pasteurization chamber is reduced to 100-3000 Pa, stop the air removal.

(4) Introducing negative pressure saturated water vapor into the pasteurization chamber. The pressure of the water vapor source is equal to or slightly higher than the water saturation pressure corresponding to the pasteurization temperature. Adjusting the water vapor flow rate after the temperature of the food reaches the pasteurization temperature, and maintaining the food at the pasteurization temperature for a period of 10 minutes to 90 minutes, then cease the introduction of water vapor.

(5) Connecting the pasteurization chamber with a cold trap with a low surface temperature (temperature: from −40° C. to 10° C.), and water vapor is condensed or deposited on the surface of the cold trap, and then pumping non-condensable gas through a vacuum pump. When the pressure in the pasteurization chamber is lower than the water saturation pressure corresponding to the temperature of the food, the condensed water on food surface evaporates and the temperature of the food decreases (6) When the pressure in the pasteurization chamber reaches or approaches the saturation pressure corresponding to the cooling temperature $T_1$, vacuum is stopped and clean air is introduced into the pasteurization chamber until the vacuum state in the pasteurization chamber is released. The food is displaced from the chamber, and finally, the pasteurization process is complete.

Example 1

The pasteurization process of the proposed invention is further explained by a preliminary study of the pasteurization process of freeze-dried chicken meat with a moisture content of 2.8%.

(1) Parameter Setting and Calculation

The pasteurization temperature was set at 75° C., and the target water activity was 0.75. By checking the isothermal moisture absorption curve of the material, the water activity was 0.06 at a temperature of 25° C. and a moisture content of 2.8%. The corresponding water activity was 0.75 at a temperature of 75° C. and a moisture content of 2.8%. The constant pressure specific heat capacity of the freeze-dried chicken was 1.7 kJ/(kg ° C.), and the temperature of the material before water vapor pasteurization was 3° C. as calculated according to the above equation (2).

(2) Vacuuming

Several pieces of the freeze-dried chicken were inoculated with *Enterococcus faecium* (ATCC 8459) at 6.3×10⁸ CFU/g; the freeze-dried chicken was cooled to −1° C. in a cold storage room and then taken out and placed in a pasteurization chamber which was vacuumed to 1000 Pa by a rotary vane vacuum pump, and the food temperature was raised to 3° C. during the process.

(3) Water Vapor Pasteurization

After vacuuming was complete, saturated water vapor at 78° C. was introduced into the pasteurization chamber, the water vapor was condensed on the surface and inside the pores of the material, and the temperature of the material was raised from 3° C. to 74° C. in 10 minutes. The water vapor flow rate was adjusted to maintain the temperature of the material at 75±1° C. for 45 min.

(4) Water Vapor Capture

The pasteurization chamber was connected with a cold trap which was introduced with refrigerant. The evaporation temperature was maintained at about −20° C. The water vapor condensed on the surface of the cold trap. When the pressure in the pasteurization chamber was reduced to 3000 Pa, non-condensable gas was pumped by a vacuum pump. During the depressurization process, the condensed water on the surface and inside the pores of the material was evaporated, and the water vapor was frosted on the surface of the cold trap, and the temperature of the material was decreased.

(5) Vacuum Releasing

When the pressure in the pasteurization chamber was reduced to 700 Pa, the temperature of the material was decreased to 20° C. the vacuum in the pasteurization chamber was released and the material was taken out.

(6) Test Results

After the testing, the moisture content of the material after pasteurization was 3.6%, and the number of inoculated *Enterococcus faecalis* was reduced to 4.0×10³ CFU/g, with a reduction of 5.2 log units. By checking the isothermal moisture absorption curve of the freeze-dried chicken at 25° C., the water activity was 0.18 with a moisture content of 3.6%. Although the moisture content and water activity of the materials have increased slightly after pasteurization, they have little effect on the quality and shelf life of the product.

The invention claimed is:

1. A water vapor pasteurization method for freeze-dried food, wherein the method comprises:
  1) determining a pasteurization temperature according to the type of the freeze-dried food to be pasteurized, and determining the target water activity at the pasteurization temperature;
  2) adjusting the food in step 1) to a cooling temperature corresponding to the type of the food;
  3) removing the air from a pasteurization chamber where the food is located by using a vacuum pump;
  4) introducing water vapor into the pasteurization chamber, adjusting the flow rate of the water vapor after the food temperature reaches the pasteurization temperature, and maintaining the food temperature at the pasteurization temperature for a specific pasteurization time and then ceasing the introduction of the water vapor;
  5) capturing water vapor from the pasteurization chamber so as to reduce the pressure in the pasteurization chamber;
  6) charging clean air into the pasteurization chamber until the vacuum state is released after the pressure in the pasteurization chamber reaches the water vapor saturation pressure corresponding to the cooling temperature prior to pasteurization, and finally removing the food from the pasteurization chamber, wherein in the step 2), the cooling temperature is determined as follows:

$$T_1 = T_2 - (x_2 - x_1)^*(h_1 - h_2)/c_p$$

where $c_p$ is constant pressure specific heat capacity of the food;
$T_1$ is the cooling temperature;
$T_2$ is the pasteurization temperature;
$x_1$ is the initial moisture content of the freeze-dried food;
$x_2$ is the moisture content of the food at the pasteurization temperature and the target water activity which is obtained by using an isothermal moisture absorption curve of the food;
$h_1$ is the enthalpy of saturated water vapor at temperature $T_1$;
$h_2$ is the enthalpy of saturated water vapor at temperature $T_2$.

2. The water vapor pasteurization method for freeze-dried food according to claim 1, wherein the pasteurization temperature determined in the step 1) is from 60 to 90° C., and the target water activity is from 0.70 to 0.85.

3. The water vapor pasteurization method for freeze-dried food according to claim 1, wherein in the step 3), air is removed from the pasteurization chamber until the absolute pressure in the pasteurization chamber is reduced to 100 to 3000 Pa.

4. The water vapor pasteurization method for freeze-dried food according to claim 1, wherein in the step 4), the water vapor introduced into the pasteurization chamber is a negative pressure saturated water vapor.

5. The water vapor pasteurization method for freeze-dried food according to claim 1, wherein in the step 4), if the water vapor introduced into the pasteurization chamber is a negative pressure saturated water vapor, the pressure of the water vapor source is equal to the water vapor saturation pressure corresponding to the pasteurization temperature.

6. The water vapor pasteurization method for freeze-dried food according to claim 4, wherein in the step 4), the saturation temperature corresponding to the pressure of the negative pressure saturated water vapor is equal to the pasteurization temperature or higher than the pasteurization temperature by 10° C. or less.

7. The water vapor pasteurization method for freeze-dried food according to claim 1, wherein in the step 4), the specific pasteurization time is from 10 min to 90 min.

8. The water vapor pasteurization method for freeze-dried food according to claim 1, wherein the step 5) is specifically carried out by: connecting the pasteurization chamber with a cold trap on the surface of which, the water vapor is condensed or deposited, and then capturing the non-condensable gas by a vacuum pump.

9. The water vapor pasteurization method for freeze-dried food according to claim 8, wherein the surface temperature of the cold trap is between −40° C. to 10° C.

\* \* \* \* \*